United States Patent [19]

Hung et al.

[11] Patent Number: 5,544,350
[45] Date of Patent: Aug. 6, 1996

[54] RATIO OF RUNNING WORK IN PROGRESS

[75] Inventors: Chin-Hui Hung, Hsin-Chu; Chen-Chin Chen, Moa-Li Hsin, both of Taiwan

[73] Assignee: Taiwan Semiconductor Manufacturing Co., Hsin-Chu, Taiwan

[21] Appl. No.: 270,689

[22] Filed: Jul. 5, 1994

[51] Int. Cl.$^6$ ............................ G06G 7/64; G06F 3/00
[52] U.S. Cl. ............ 395/500; 364/468.18; 364/468.28; 364/488; 364/490; 437/8; 395/52; 395/904; 395/61
[58] Field of Search ...................... 364/488, 489, 364/490, 491, 468, 469, 478, 580, 570, 550, 552, 551.01, 474.16, 131–132, 138; 395/500, 61, 904, 52; 437/8, 190–195, 209

[56] References Cited

U.S. PATENT DOCUMENTS

| | | | |
|---|---|---|---|
| 4,819,176 | 4/1989 | Ahmed et al. | 364/468 |
| 5,119,318 | 6/1992 | Paradies et al. | 395/61 |
| 5,210,041 | 5/1993 | Kobayashi et al. | 437/8 |
| 5,219,765 | 6/1993 | Yoshida et al. | 437/8 |
| 5,231,585 | 7/1993 | Kobayashi et al. | 364/468 |
| 5,237,508 | 8/1993 | Furukawa et al. | 364/468 |
| 5,240,866 | 8/1993 | Friedman et al. | 437/8 |
| 5,341,304 | 8/1994 | Sakamoto et al. | 364/468 |
| 5,355,320 | 10/1994 | Erjavic et al. | 364/488 |

*Primary Examiner*—Kevin J. Teska
*Assistant Examiner*—Jacques H. Louis-Jacques
*Attorney, Agent, or Firm*—George O. Saile; Graham S. Jones, II

[57] ABSTRACT

This method provides for increasing integrated circuit production of a fabrication facility comprising collecting data from a plurality of machines, calculating of the present Ratio of Running Work (RRW), comparing present RRW to optimum RRW, checking the system to determine which machines are idle, and taking steps to increase the number of running machines. Steps taken to decrease the number of idle machines include dispatching commands to a computerized dispatching system or operators. The steps of the process are repeated to further increase RRW.

19 Claims, 2 Drawing Sheets

RATIO OF RUNNING WORK IN PROGRESS

BACKGROUND OF THE INVENTION

1. Field of the Invention

This invention relates to processes of manufacture of integrated circuit chips and more particularly to production control of a manufacturing process therefor.

2. Description of Related Art

As currently practiced, shift performance indicators, which are monitored by shop personnel of integrated circuit (IC) fabrication lines, are time-lag performance indicators. There are three disadvantages of time-lag performance indicators. First, no timely production line information can be provided. Second, time-lag performance indicators are unfair to each shift because of interaction between shifts brought by time-lag performance indicators. Last, utilization of machine capacity is likely to drop during the period of shift transition, where the shift transition is defined as the transition of one shift going to be off duty and another shift going to be on duty.

U.S. Pat. No. 5,219,765 of Yoshida et al "Method for Manufacturing a Semiconductor Device Including Wafer Aging, Probe Inspection, and Feeding Back the Results of the Inspection to the Device Fabrication Process" describes a method for manufacturing semiconductor devices including test from which information is fed back for fabrication process improvement.

U.S. Pat. No. 5,240,866 of Friedman et al "Method for Characterizing Failed Circuits on Semiconductor Wafers" shows a method for characterizing failed circuits on semiconductor wafers.

U.S. Pat. No. 5,210,041 of Kobayashi et al "Process for Manufacturing Semiconductor Integrated Circuit Device" shows computer control of testing/feedback to chip manufacturing process.

SUMMARY OF THE INVENTION

In accordance with this invention acceleration of integrated circuit (IC) fabrication (FAB) lines work in progress (WIP) is described and evaluated by Ratio of Running Work in Progress (RRW). In addition, RRW is a real time performance indicator of IC FAB which is related to productivity. RRW is a fair performance indicator of the management because of no interaction between shifts. The management referred to is section managers who will review performance of all shifts monthly. Productivity is one of the most important items of performance.

There are three improvements obtained by using RRW as a performance indicator.

First, production running performance can be monitored on a timely basis.

Second, performance of shifts can be compared fairly because no interaction is brought about between shifts.

Last, utilization of machine capacity can be maintained until the end of each shift.

In accordance with this invention, a method is provided for increasing integrated circuit production of a fabrication facility comprising collecting data from a plurality of machines, supervising by calculation of present RRW, comparing present RRW to optimum RRW, checking the system to determine which machines are idle, and taking steps increasing the number of running machines.

Preferably, steps taken to decrease the number of idle machines including dispatching commands to a computerized dispatching system or operators.

Preferably, the steps of the process are repeated to further increase RRW.

In accordance with another aspect of this invention, a method is provided for increasing integrated circuit production of a fabrication facility including a plurality of semiconductor processing machines comprising the program comprising:

(1) the supervisor program checks the RRW to determine Is RRW<Target?

If YES, continue to (2);

If NO, proceed to (8) to stop the program;

(2) the supervisor program searches to identify a location where the RRW is less than the local target value;

(3) the supervisor program checks the capacity utilization to make the decision:

Is capacity utilization of the identified location out of control?

If YES, continue to (4);

If NO, proceed to (5);

(4) the supervisor program takes actions comprising (a) redispatching and (b) auditing idle machines, (5) the supervisor program data indicating machine availability to determine whether machine availability of the identified location is out of control, If YES, continue to (6), If NO, proceed to (7);

(6) The supervisor program takes actions including (a) redispatching and (b) auditing machines which are down.

(7) The supervisor program to determine whether there is any other location with an RRW less than the local target value, and If YES, return to (2)

If NO, proceed to (8) to stop the program.

In accordance with still another aspect of this invention, a system is provided for operating an integrated circuit fabrication facility comprising means for collecting data from a plurality of machines, means for supervising by calculation of present RRW, means for comparing present RRW to optimum RRW, means for checking the system to determine which machines are idle, and means for taking steps to increase the number of running machines.

Preferably steps are taken to decrease the number of idle machines includes dispatching commands to a computerized dispatching system or operators.

Preferably, the steps of the process are repeated to further increase RRW.

Preferably, the machines include CVD, Chemical Vapor Deposition; DIF, Diffusion; DRY Dry etching IMP, Ion implantation; PHO, Photoresist; SPU, Sputtering; WET, Wet etching; MAR,Machine Availability Ratio; processing machines.

Preferably, the system includes a program comprising:

(1) the supervisor program checks the RRW to determine Is RRW<Target?

If YES, continue to (2);

If NO, proceed to (8) to stop the program;

(2) the supervisor program searches to identify a location where the RRW is less than the local target value;

(3) the supervisor program checks the capacity utilization to make the decision:

Is capacity utilization of the identified location out of control?

If YES, continue to (4);

If NO, proceed to (5);

(4) the supervisor program takes actions comprising (a) redispatching and (b) auditing idle machines, (5) the supervisor program data indicating machine availability to determine whether machine availability of the identified location is out of control, If YES, continue to (6), If NO, proceed to (7);

(6) The supervisor program takes actions including (a) redispatching and (b) auditing machines which are down.

(7) The supervisor program to determine whether there is any other location with an RRW less than the local target value, and.

If YES, return to (2)

If NO, proceed to (8) to stop the program.

Preferably, the steps of the program are repeated to further increase RRW.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

Figure 1:
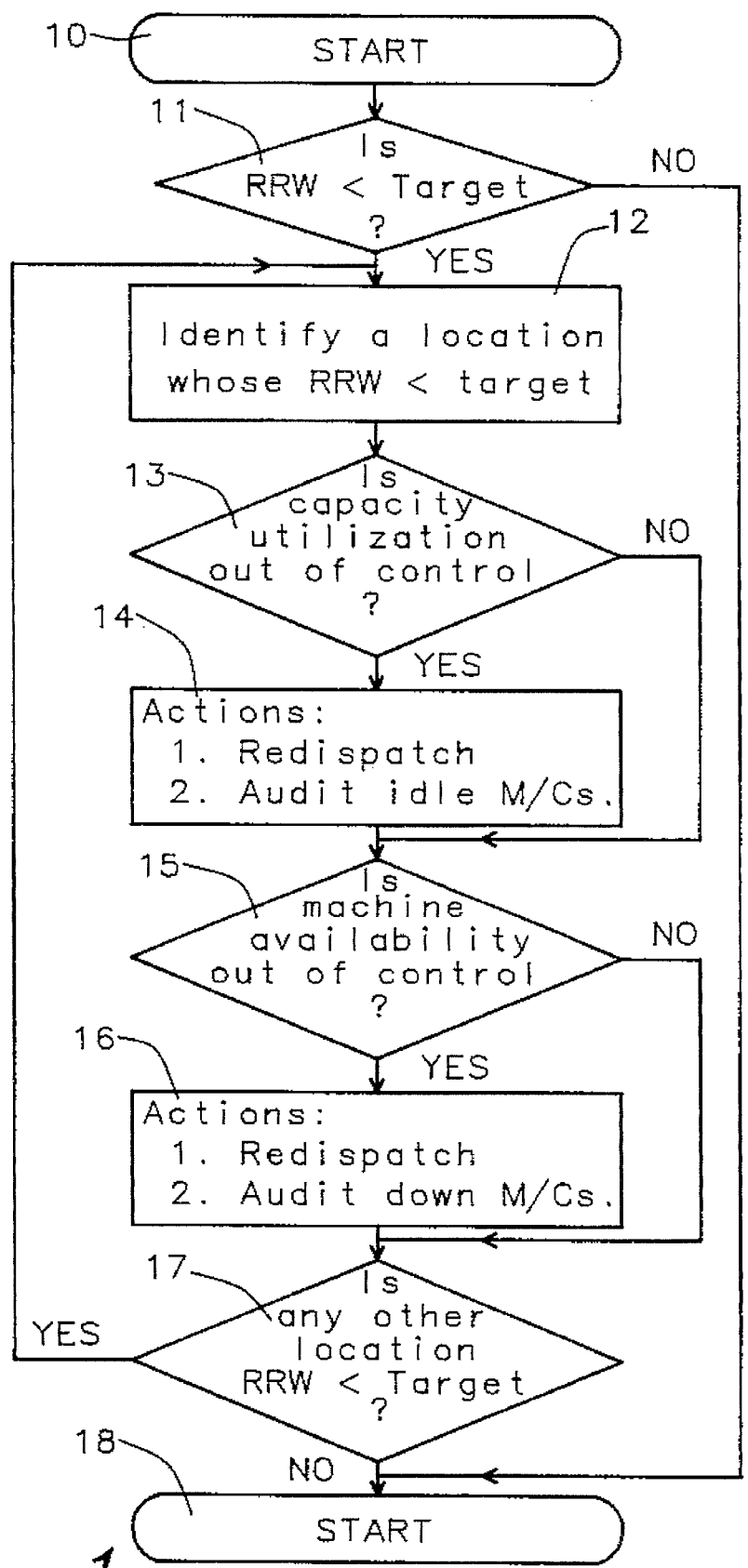
FIG. 1 shows a process of increasing FAB productivity is illustrated in flow chart form which shows an algorithm for use on a computer connected to a FAB for optimization of the productivity of the FAB.

Referring to FIG. 1, a process of increasing FAB productivity is illustrated in flow chart form. The process comprises an algorithm for use on a computer connected to the FAB for optimization of the productivity of the FAB and is started as indicated by terminal block 10 in FIG. 1.

Step 1

The supervisor program as shown in decision block 11 in FIG. 1 checks Table A below. The ratio of WIP (work in progress) report is checked to determine (as indicated by decision block 11 in FIG. 1) on a FAB-wide basis:

Is RRW<Target?

where RRW (Ratio of Running WIP)

Target=FAB-wide target value

If YES, continue to Step 2 in block 12.

If NO, proceed to step 8 in block 18.

For example, 0.262 is less than 0.27 so go to Step 2 in block 12.

Table A shows RRW FAB-wide and other data by areas listed generated by central FAB computer system showing the RRW for each area.

TABLE A

| TIME | WIP | RATIO OF RUNNING WIP | | | | | | | |
|---|---|---|---|---|---|---|---|---|---|
| | | RRW | CVD | DIF | DRY | IMP | PHO | SPU | WET |
| 02/22 07 | 30310 | .209 | .094 | .315 | .182 | .079 | .160 | .564 | .288 |
| 02/22 10 | 30677 | .262 | .156 | .332 | .226 | .052 | .189 | .651 | .493 |
| TARGET | 30677 | .270 | .200 | .500 | .200 | .170 | .200 | .170 | .400 |

Step 2

The supervisor program as shown in processing block 12 in FIG. 1 works to identify a location where the RRW is less than the local target value.

For example, location IMP (ion IMPlantation) is identified.

Step 3

The supervisor program as shown in decision block 13 in FIG. 1 checks Table B which is the capacity utilization report to make the test:

Is capacity utilization (of the identified location) out of a predetermined tolerable range If YES, (out of a predetermined tolerable range) continue to Step 4 in block 14.

If NO, (in a predetermined tolerable range) proceed to step 5 in block 15.

For example, if capacity utilization of IMP has a value of only 0.3, that shows that there are numerous IMP machines idle and in need of an additional supply of wafers.

Table B shows current capacity utilization with CUR FAB-wide and the other data for FAB areas as listed.

TABLE B

| TIME | CAPACITY UTILIZATION (CUR) | | | | | | | |
|---|---|---|---|---|---|---|---|---|
| | CUR | CVD | DIF | DRY | IMP | PHO | SPU | WET |
| 02/22 07 | .537 | .245 | .544 | .754 | .500 | .860 | .455 | .221 |
| 02/22 10 | .734 | .872 | .683 | .750 | .300 | .911 | .458 | .512 |

Step 4

The supervisor program as shown in processing block 14 in FIG. 1 takes actions including (1) redispatching and (2) auditing idle machines. Idle machines are those waiting for wafers.

(For example, the supervisor checks Table C comparing current dispatching status with WIP distribution and then makes a determination that it will redispatch photo machines as shown in Table D to supply more wafers to IMP machines to increase capacity utilization of IMP machines.

In the PHO M/C allocation column the value "1" for SIN-1-PHO indicates PHOTO machine numbered "1" is processing

TABLE C

CURRENT PHOTO MACHINES DISPATCHING VS. WIP DISTRIBUTION

| PROCESS ORDER OR STAGE | WIP | PHO M/C ALLOCATION |
|---|---|---|
| WAF-START | 480 | |
| PAD-OX-1 | 408 | |
| SIN-1-DEP | 720 | |
| SIN-1-PHO | 360 | 1 |
| SIN-1-ETCH | 576 | |
| N-WL-1-IMP | 72 | |
| WELL-OX | 850 | |
| SIN-1-RM | 24 | |
| WELL-PHO | 48 | |
| N-WL-2-IMP | 18 | |
| PWELL-PHO | 24 | |
| P-WL-2-IMP | 24 | |
| P-WL-DRIV | 24 | |
| WELL-DRIV | 696 | |
| PAD-OX-2 | 35 | |
| SIN-2-DEP | 216 | |
| SIN-2-PHO | 204 | 2 |
| SIN-2-ETCH | 360 | |
| N_FLD_IMP | 24 | |
| P-_FLD_PHO | 288 | |
| P-_FLD_IMP | 0 | | wafers at SIN-1-PHO stages. The processed wafers will then come to SIN-1-ETCH stage and wait to be processed by DRY machines.

The value "2" for SIN-2-PHO indicates that PHOTO machine numbered "2" is processing wafers at SIN-2-PHO stage. The processed wafers will then come to SIN-1-ETCH stage and wait to be processed by DRY machines.

In table D below the "1" (for PHOTO machine numbered "1") is moved to P_-FLD_PHO to overcome under utilization in CUR in Table B.

The wafers at P-_FLD_PHD will come to P-_FLD_IMP stage after they are processed by PHOTO machine numbered "1", and then more IMP machines can be utilized. In the last row the "0" indicates under utilization (idle machines).

TABLE D

REDISPATCHED PHOTO MACHINES VS. WIP DISTRIBUTION

| PROCESS ORDER OR STAGE | WIP | PHO M/C ALLOCATION |
|---|---|---|
| WAF-START | 480 | |
| PAD-OX-1 | 408 | |
| SIN-1-DEP | 720 | |

TABLE D-continued

REDISPATCHED PHOTO MACHINES VS. WIP DISTRIBUTION

| PROCESS ORDER OR STAGE | WIP | PHO M/C ALLOCATION |
|---|---|---|
| SIN-1-PHO | 360 | 1 |
| SIN-1-ETCH | 576 | |
| N-WL-1-IMP | 72 | |
| WELL-OX | 850 | |
| SIN-1-RM | 24 | |
| WELL-PHO | 48 | |
| N-WL-2-IMP | 18 | |
| PWELL-PHO | 24 | |
| P-WL-2-IMP | 24 | |
| P-WL-DRIV | 24 | |
| WELL-DRIV | 696 | |
| PAD-OX-2 | 35 | |
| SIN-2-DEP | 216 | |
| SIN-2-PHO | 204 | 2 |
| SIN-2-ETCH | 360 | |
| N_FLD_IMP | 24 | |
| P-_FLD_PHO | 288 | |
| P-_FLD_IMP | 0 | 1 |

Step 5

The supervisor program as shown in decision block 17 in FIG. 1 checks Table E which contains data indicating Machine Availability to determine whether machine availability of the identified location is out of control.

If YES, (out of control) continue to Step 6 in block 16.

If NO, (in control) proceed to step 7 in block 17.

For example, only 57% of the IMP machines are available for production. The value 1.00 under WET machine listing indicates full availability.

TABLE E

| | Machine Availability | | | | | | | |
|---|---|---|---|---|---|---|---|---|
| TIME | CVD | DIF | DRY | IMP | PHO | SPU | WET | MAR |
| 02/22 09:59 | 0.92 | 0.76 | 0.88 | 0.57 | 0.93 | 0.93 | 1.00 | 0.87 |
| 02/22 06:57 | 0.89 | 0.76 | 0.90 | 0.86 | 0.93 | 0.76 | 0.92 | 0.85 |

Step 6

The supervisor program as shown in processing block 16 in FIG. 1 takes actions including (1) redispatching and (2) auditing machines which are down. Down machines are those which are out of order.

For example, the supervisor sets a list of priorities for the sequence in which repairs are to be made by equipment maintenance engineers.

Step 7

The supervisor program as shown in decision block 17 in FIG. 1 checks Table A above to determine whether there is any other location with an RRW less than the local target value.

If YES, (out of control) return to Step 2 in block 12

If NO, proceed to step 8 in block 18.

For example, location CVD is identified as a location with an RRW less than the local target value.

Step 8

The program is ended by the supervisor program as shown by terminal block 18 in FIG. 1.

Figure 2:
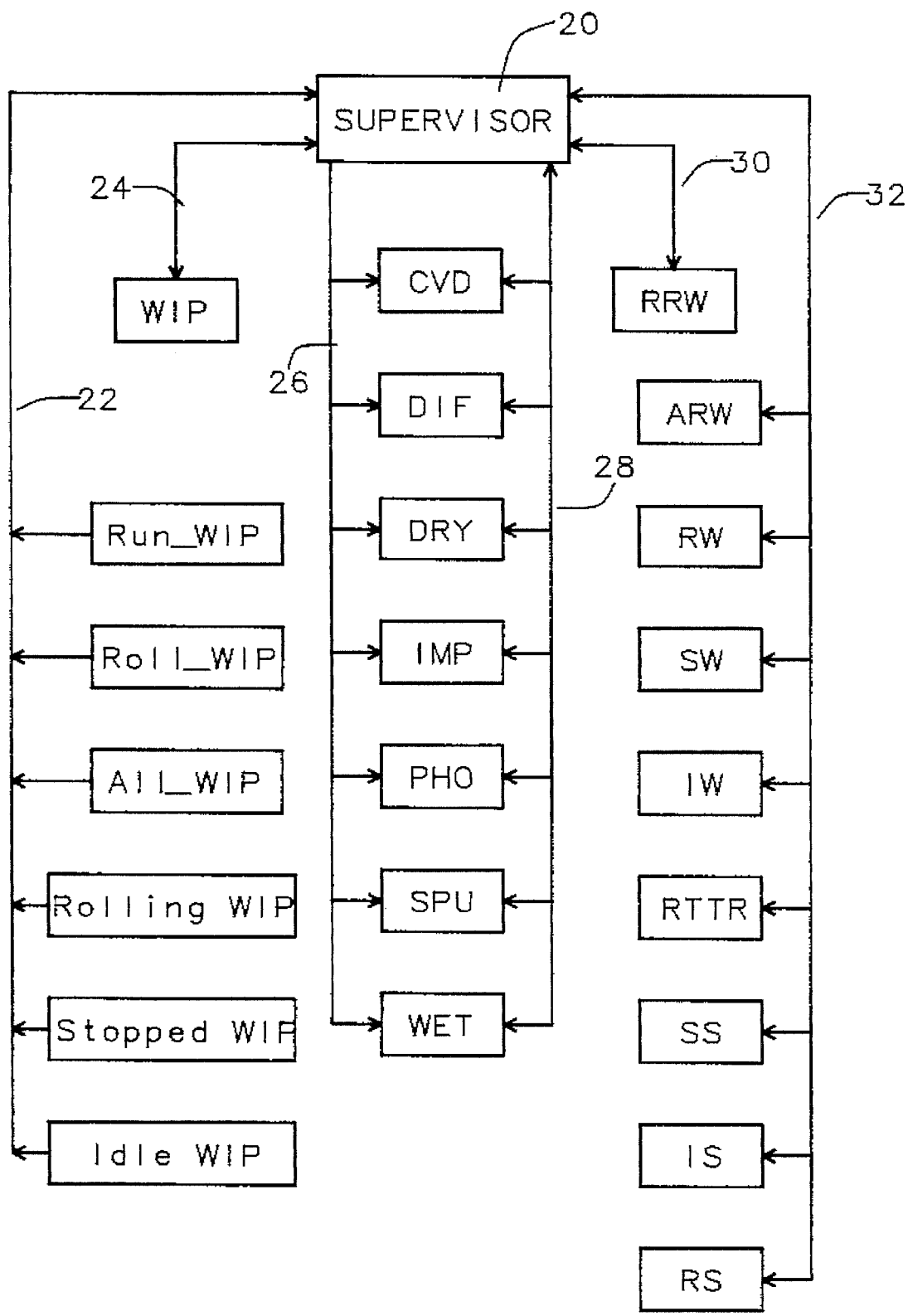
FIG. 2 shows a computer control system in accordance with this invention.

FIG. 2 shows a computer control system in accordance with this invention including supervisor 20 comprising a computer which can be interactively operated by an operator and alternatively can be operated independently of an operator.

The supervisor is connected by bus line 22 to supply data to and receive data from data tables including Run_WIP Roll_WIP, All_WIP, Rolling WIP, Stopped WIP, and Idle WIP.

The supervisor is also connected by bus line 24 to supply data to and receive data from data table WIP.

The supervisor is connected by bus line 26 to supply data to machine units and receiving data from those machine units on bus line 28. The machine units include as follows:

CVD Chemical Vapor Deposition

DIF Diffusion

DRY Dry etching

IMP Ion implantation

PHO Photoresist (lithography)

SPU Sputtering

WET Wet etching

MAR Machine Availability Ratio

The supervisor is also connected by bus line 30 to supply data to and receive data from data table RRW.

The supervisor is connected by bus line 32 to supply data to and receive data from data tables including ARW, Rolling WIP, RW; Stopped WIP, SW; Idle WIP, IW; TR/dt, RTTR; Stopped Stage, SS; Idle Stage, IS; and Rolling Stage, RS.

Daily Turn Ratio

Daily Turn Ratio (DTR) is one of the most important indicators of performance for an IC fabrication line. A high value of DTR leads to a short cycle time and high productivity. DTR is usually expressed as an average number of stages through which WIP moves within one day. DTR can be interpreted as a final speed that WIP reaches at the end the day. In physics, it is well known that speed comes from acceleration. Thus, it is necessary to keep the acceleration of WIP as high as possible during a specific period to reach a high final speed at the end of the period.

Derivation of RRW

Definition of Daily Turn Ratio

The Daily Turn Ratio, as defined by equations (1) and (2) in Table F below, is the average number of stages through which WIP moves within one day. The final speed which WIP reaches at the end of the day is the calculation which is done. The Turn Ratio TR (which can be daily (DTR), hourly, weekly, etc.) is the speed of WIP.

Theory

Achievement of High TR

Achievement of High TR requires maintaining high acceleration of WIP.

In a given period, WIP of an IC fabrication line can be divided into three categories:

(1) Rolling WIP (running beginning to end, but with some stops.)

(2) Stopped WIP (WIP running at beginning of period, but stops during the period.)

(3) Idle WIP (no processing of WIP in current period.)

The turn ratio TR of this given period can be calculated by equation (3) in Table F.

Definition of Acceleration of Turn Ratio (TR)

Acceleration of WIP can be derived as a derivative of TR with respect to time, which is called the Real Time Turn Ratio (RTTR). In equation (4) the derivative TR/dt of equation (3) is taken, yielding the value RTTR. The second and third terms in the numerator of the equation have a derivative of "0" because $SS_k$ and $IS_1$ are constants, and the result is shown in equation (5) in Table F.

Referring to equation (5), it is assumed that $RS_j/dt=ARW$ for all $RS_j$, $J=1, \ldots, p$, where ARW is a constant called Acceleration of Rolling WIP. Making the substitution of ARW for $RS_j/dt$ yields equation (6) in Table F.

The equation (6) in Table F is equal to equation (7) because:

$$\text{Roll\_WIP} = \sum_{j=1}^{p} RW_j, \text{ summation of Rolling WIP and}$$

$$\text{All\_WIP} = \sum_{j=1}^{p} RW_j + \sum_{k=1}^{q} W_k + \sum_{l=1}^{r} IW_l, \text{ summation of all WIP}$$

Rolling WIP of a given period is equal to running WIP at the beginning of this period when the length of this period is approximately equal to zero. Thus RTTR in equation (6) in Table F is equal to equation (7).

Let RRW denote Ratio of Running WIP to all WIP, then the equation (9) in table F is the measure of RTTR.

Since ARW is an unknown constant, it is impossible to calculate RTTR from RRW. Fortunately, RRW can be used instead of RTTR to reflect acceleration of WIP at any moment because ARW is a constant. An experiment must be made to test whether there is a linear relationship between RRW and TR before acceptance of RRW as a performance indicator of a production line.

TABLE F $$DTR = \frac{\sum_{i=1}^{n} M_i}{\sum_{i=1}^{n} W_i} \quad (1)$$

$$DTR = \frac{\sum_{i=1}^{n} M_i \times S_i}{\sum_{i=1}^{n} W_i} \quad (2)$$

TABLE F-continued $$TR = \frac{\sum_{j=1}^{p} RW_j \times RS_j + \sum_{k=1}^{q} SW_k \times SS_k + \sum_{l=1}^{r} IW_l \times IS_l}{\sum_{j=1}^{p} RW_j + \sum_{k=1}^{q} SW_k + \sum_{l=1}^{r} IW_l} \quad (3)$$

$$TR/dt = \quad (4)$$

$$\frac{\sum_{j=1}^{p} RW_j \times RS_j/dt + \sum_{k=1}^{q} SW_k \times SS_k/dt + \sum_{l=1}^{r} IW_l \times IS_l/dt}{\sum_{j=1}^{p} RW_j + \sum_{k=1}^{q} SW_k + \sum_{l=1}^{r} IW_l}$$

$$RTTR = \frac{\sum_{j=1}^{p} RW_j \times RS_j/dt}{\sum_{j=1}^{p} RW_j + \sum_{k=1}^{q} SW_k + \sum_{l=1}^{r} IW_l} \quad (5)$$

$$RTTR = \frac{\sum_{j=1}^{p} RW_j \times RS_j/dt}{\sum_{j=1}^{p} RW_j + \sum_{k=1}^{q} SW_k + \sum_{l=1}^{r} IW_l} \times ARW \quad (6)$$

$$RTTR = \frac{Roll\_WIP}{All\_WIP} \times ARW \quad (7)$$

$$RTTR = \frac{Run\_WIP}{All\_WIP} \times ARW \quad (8)$$

$$RTTR = RRW \times ARW \quad (9)$$

$M$ = move
$n$ = lots in production
$W$ = work in progress
$S$ = stage
$RW$ = Rolling WIP
$SW$ = Stopped WIP
$IW$ = Idle WIP
$RTTR = TR/dt$
$Run\_WIP$ = constant running
$Roll\_WIP$ = constant running
$All\_WIP$ = constant running Experimental Data Data of TR of every three-hours and RRW at the beginning of each three hours has been collected from July 1 to July 9 and the following model has been derived from the collected data.

$RTTR = TR_{t+1}$ = $RRW_{t1} \times 0.789$, time = "07:00" or "19:00"
= $RRW_t \times 0.811$, time = "10:00" or "22:00"
= $RRW_t \times 0.937$, time = "01:00" or "13:00"
= $RRW_t \times 1.189$, time = "04:00" or "16:00"

The sample correlation of the coefficient for this model is 0.96. This correlation indicates a very strong linear relationship between TR and RRW. That is, RRW is as good as TR as a performance indicator of an IC fabrication line, without consideration of other benefits brought by RRW.

RRW was included in a report and reviewed daily for a significant period of time. The improvements gained are shown below in Table G. Note that RRW increased 0.01 which means that a six-lot wafer out capacity increase per month occurred for a WIP=20000 pieces FAB.

TABLE G

|  | Mean of RRW | Variance of RRW |
| --- | --- | --- |
| 7/1/93–8/10/93 | 0.216 | 0.0012 |
| 8/11/93–9/20/93 | 0.226 | 0.0008 |
| Improvement | 0.01 | −0.0004 |
| Improvement in % | 4.63% | −33.33% |

SUMMARY

Main Points

Acceleration of integrated circuit (IC) fabrication (FAB) lines work in progress (WIP) can be described and evaluated by Ratio of Running Work in Progress (RRW).

In addition, RRW is a real time performance indicator of IC FAB which is related to turn ratio, move and throughput.

RRW is a fair performance indicator of the management because of no interaction between shifts.

Problems Solved

An index which can provide real time production information about acceleration of WIP and running status is provided.

Fluctuations in production can be avoided during shift transition.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by Letters Patent is as follows:

1. A computer-implemented method for increasing integrated circuit production of a fabrication facility comprising the steps as follows:

collecting data from a plurality of machines in an integrated circuit production of a fabrication facility, calculating a present Ratio of Running Work in Progress, RRW, comparing present RRW to optimum RRW, checking the fabrication facility to determine which machines are idle, and taking steps for increasing the number of running machines and taking steps for reducing the number of idle machines.

2. A method in accordance with claim 1 wherein steps taken to decrease the number of idle machine includes dispatching commands to a computerized dispatching system or operators.

3. A method in accordance with claim 2 wherein said machines include CVD, Chemical Vapor Deposition; DIF, Diffusion; DRY Dry etching IMP, Ion implantation; PHO, Photoresist; SPU, Sputtering; WET, Wet etching; processing machines.

4. A method in accordance with claim 1 wherein the steps of the process are repeated to further increase RRW.

5. A method in accordance with claim 4 wherein said steps taken for reducing the number of idle machines includes dispatching commands to a computerized dispatching system or operators.

6. A method in accordance with claim 5 wherein said machines include CVD, Chemical Vapor Deposition; DIF, Diffusion; DRY Dry etching IMP, Ion implantation; PHO, Photoresist; SPU, Sputtering; WET, Wet etching; processing machines.

7. A method in accordance with claim 4 wherein said machines include CVD, Chemical Vapor Deposition; DIF, Diffusion; DRY Dry etching IMP, Ion implantation; PHO, Photoresist; SPU, Sputtering; WET, Wet etching; processing machines.

8. A method in accordance with claim 1 wherein said machines include CVD, Chemical Vapor Deposition; DIF, Diffusion; DRY Dry etching IMP, Ion implantation; PHO, Photoresist; SPU, Sputtering; WET, Wet etching; processing machines.

9. A computer-implemented method for increasing integrated circuit production of a fabrication facility including a plurality of semiconductor processing machines with a supervisor program for performing the steps comprising:

(1) the supervisor program checks the Ratio of Running Work in Progress, RRW in said fabrication facility to determine Is RRW<Target?
If YES, continue to (2);
If NO, proceed to (8) to stop the program;

(2) the supervisor program searches said fabrication facility to identify a location in said fabrication facility where the RRW is less than the local target value;

(3) the supervisor program checks the capacity utilization to make the decision:
Is capacity utilization of the identified location in said fabrication facility outside of a predetermined tolerable range?
If YES, continue to (4);
If NO, proceed to (5);

(4) the supervisor program takes actions comprising
(a) redispatching machines in said fabrication facility and
(b) auditing idle machines in said fabrication facility, (5) the supervisor program data indicating machine availability to determine whether machine availability of the identified location in said fabrication facility is,
If YES, continue to (6),
If NO, proceed to (7);

(6) The supervisor program takes actions including
(a) redispatching machines in said fabrication facility and
(b) auditing machines which are down, (7) The supervisor program determines whether there is any other location in said fabrication facility with an RRW less than the local target value, and
If YES, return to (2),
If NO, proceed to (8) to stop the program, (8) Stop the program.

10. A method in accordance with claim 9 wherein steps are taken to decrease the number of idle machines including dispatching commands to a computerized dispatching system or operators.

11. A method in accordance with claim 10 wherein the steps of the process are repeated to further increase RRW.

12. A method in accordance with claim 9 wherein said machines include CVD, Chemical Vapor Deposition; DIF, Diffusion; DRY Dry etching IMP, Ion implantation; PHO, Photoresist; SPU, Sputtering; and WET, Wet etching; processing machines.

13. A system for operating an integrated circuit fabrication facility comprising means for collecting data from a plurality of machines in said fabrication facility, means for calculating a present Ratio of Running Work in Progress, RRW, means for comparing present RRW to optimum RRW, means for checking the fabrication facility to determine which machines are idle, and means for increasing the number of running machines in said fabrication facility and reducing the number of idle machines in said fabrication facility.

14. A system in accordance with claim 13 wherein steps taken to decrease the number of idle machines includes dispatching commands to a computerized dispatching system or operators.

15. A system in accordance with claim 13 wherein the steps of the process are repeated to further increase RRW.

16. A system in accordance with claim 15 wherein steps taken to decrease the number of idle machines includes dispatching commands to a computerized dispatching system or operators.

17. A system in accordance with claim 13 wherein said machines include CVD, Chemical Vapor Deposition; DIF, Diffusion; DRY Dry etching IMP, Ion implantation; PHO, Photoresist; SPU, Sputtering; and WET, Wet etching; processing machines.

18. A system in accordance with claim 13 wherein said system includes a supervisor program wherein, (1) the supervisor program checks the Ratio of Running Work in Progress, RRW in said fabrication facility to determine Is RRW<Target?
If YES, continue to (2);
If NO, proceed to (8) to stop the program;

(2) the supervisor program searches to identify a location in said fabrication facility where the RRW is less than the local target value;

(3) the supervisor program checks the capacity utilization to make the decision:
Is capacity utilization of the machines at an identified location outside of a predetermined tolerable range?
If YES, continue to (4);
If NO, proceed to (5);

(4) the supervisor program takes actions comprising
(a) redispatching machines in said fabrication facility and
(b) auditing idle machines in said fabrication facility, (5) the supervisor program data indicating machine availability to determine whether machine availability of the identified location is outside of a predetermined tolerable range,
If YES, continue to (6),
If NO, proceed to (7);

(6) The supervisor program takes actions including
(a) redispatching machines in said fabrication facility, and
(b) auditing machines which are down, (7) The supervisor program determines whether there is any other location with an RRW less than the local target value, and
If YES, return to (2)
If NO, proceed to (8) to stop the program, (8) Stop the program.

19. A system in accordance with claim 18 wherein the steps are repeated to further increase RRW.

* * * * *